United States Patent [19]
Gauld et al.

[11] Patent Number: 5,323,807
[45] Date of Patent: Jun. 28, 1994

[54] STOP DROP VALVE

[75] Inventors: James B. Gauld; William D. Fralick, both of Bamberg; Robert M. Patrick, Orangeburg, all of S.C.

[73] Assignee: Delavan Inc., West Des Moines, Iowa

[21] Appl. No.: 108,871

[22] Filed: Aug. 18, 1993

[51] Int. Cl.5 ............................................. F16K 15/02
[52] U.S. Cl. .............................. 137/543.15; 137/903; 137/906
[58] Field of Search ................... 137/543.15, 903, 906

[56] References Cited
U.S. PATENT DOCUMENTS

| | | | |
|---|---|---|---|
| 661,603 | 11/1900 | Gold | 137/903 |
| 2,143,399 | 1/1939 | Abercrombie | 137/906 |
| 2,289,946 | 7/1942 | Weatherhead | 137/543.15 X |
| 4,172,465 | 10/1979 | Dashner | 137/543.15 X |

FOREIGN PATENT DOCUMENTS 655560  7/1951  United Kingdom ........... 137/543.15

Primary Examiner—Robert G. Nilson
Attorney, Agent, or Firm—Howard S. Reiter; Richard W. Watson

[57] ABSTRACT

A check valve having a reduced or zero pressure drop and more particularly such a valve in combination with a spray nozzle. The check valve includes a sealed gas chamber which has within it a closed-cell foam element which insures that some gas remains in the chamber even if the primary seal fails. The new valve/nozzle combination allows valve operating pressure to be set very close to nozzle operation pressure which allows the nozzle to achieve full spray more quickly at start-up and a more immediate cessation of flow at shut off.

14 Claims, 1 Drawing Sheet

STOP DROP VALVE

FIELD OF THE INVENTION

The present invention relates generally to check valves and more specifically to such a valve having a substantially reduced or eliminated pressure drop. Also disclosed is the combination of such a valve with a spray nozzle.

BACKGROUND OF THE INVENTION

In prior spraying applications, when nozzles have been used without a check valve, the result at start up has been that fluid at first drips or dribbles from the nozzle, and then flows in an increasing stream which develops into a spray as full pump pressure develops. Only then is the desired spray pattern achieved. At shut down, a similar sequence occurs except in reverse order. Thus, when the pump stops the spray pattern deteriorates into a small fluid stream which issues from the nozzle for a short period and that stream reverts to a dribble as the pressure approaches zero. The presence of such streams or dribbles is, at the very least, wasteful of the fluid intended to be sprayed and often objectionable or even dangerous. For example, in the operation of oil burners, when fuel enters the combustion chamber in anything other than the desired spray pattern, the fuel is difficult to ignite, incomplete combustion occurs after ignition, undesired combustion products are produced and fuel is wasted. Another example is in agricultural spraying operations where insecticides, herbicides, disinfectants and other chemicals are used for a variety of purposes. Here, in addition to wastefulness, other potential problems include skin or foliage burns, eye irritation or injury and dangerous accumulation of chemicals on surfaces.

More recently, a variety of efforts have been made to improve these start up and shut down shortcomings by the use of check valves in combination with spray nozzles. In a typical prior check valve significant pressure drop occurs as a valve opens because applied pressure on the back of the movable valve member partially cancels supply pressure on the front. There are several potential problems caused by the pressure drop through such a typical check valve. It is necessary to increase system pressure to compensate for reduced flow due to the pressure required to hold the valve open. Failure of a typical check valve could result in a higher than specified pressure and flow condition. Removal of a check valve from a system without a system pressure adjustment could also result in a higher than specified pressure and flow condition. The operating or opening pressure of the typical check valve in a nozzle is usually significantly lower than the nozzle operating pressure in order to minimize pump capacity or pressure requirements. This lower check valve pressure reduces the effectiveness of the valve in controlling complete spray formation at start up and complete flow stoppage at shut down. Thus, for example, it may be necessary to supply 135 psi of pump pressure to hold such a valve open and to maintain 100 psi in the spray nozzle of a domestic oil burner. Thus the pressure drop is 35 psi. In this instance, since fluid flow through the nozzle does not begin until the pressure reaches 35 psi, the time interval to reach full pressure and full spray is somewhat reduced as compared to a nozzle without a valve and the time that the nozzle produces a drip or drizzle or small stream or undeveloped spray pattern is also reduced to a degree. While these check valve/nozzle combinations have achieved some reduction in the time interval required to reach full pressure and full spray, there is still an objectionable time lapse from the beginning of flow to the development of a full spray pattern. Conversely, when the pump is turned off, there is a reduced but still significant time before flow ceases entirely. Thus, unless a much larger pump is used, the same problems as recited above with simple nozzles still exist in valve/nozzle combinations except to a lesser degree.

SUMMARY OF THE INVENTION

It has been found that pressure drop as previously described can be substantially reduced or even eliminated by including in the check valve a sealed and pressurized gas chamber which opposes the pressure of incoming fluid. The use of such a check valve design results in a combination in which little or no extra pump pressure is required. Since little or no extra pressure is needed, the opening and closing pressure of the valve can be set very close to the operating pressure and the time interval from the initiation of flow to full pressure flow is substantially reduced which means dripping and dribbling are substantially eliminated and a full spray pattern is developed much more rapidly without any increase in pump size. Furthermore, valve failure or removal would not result in significantly increased fluid flow.

It is thus a primary object of the invention to provide a check valve having zero or minimal pressure drop and which thus requires less input pressure to achieve full performance.

A further primary object is to provide such a valve which, when combined with a spray nozzle, allows valve operating pressure to be set very close to the nozzle operating pressure. This in turn leads to very rapid development of a full spray pattern when the valve opens and a very rapid shutdown when the valve closes. Yet another object of the invention is to provide a check valve which leads to more efficient atomization and utilization of the fluid being moved. In many situations, this can mean reduced emissions of noxious or harmful materials or more efficient fuel utilization and thus, more economical operation.

BRIEF DESCRIPTION OF THE DRAWINGS

A fuller understanding of the present invention will be gained by reference to the following detailed description when read in conjunction with the attached drawings in which.

DETAILED DESCRIPTION OF THE INVENTION

Figure 1:
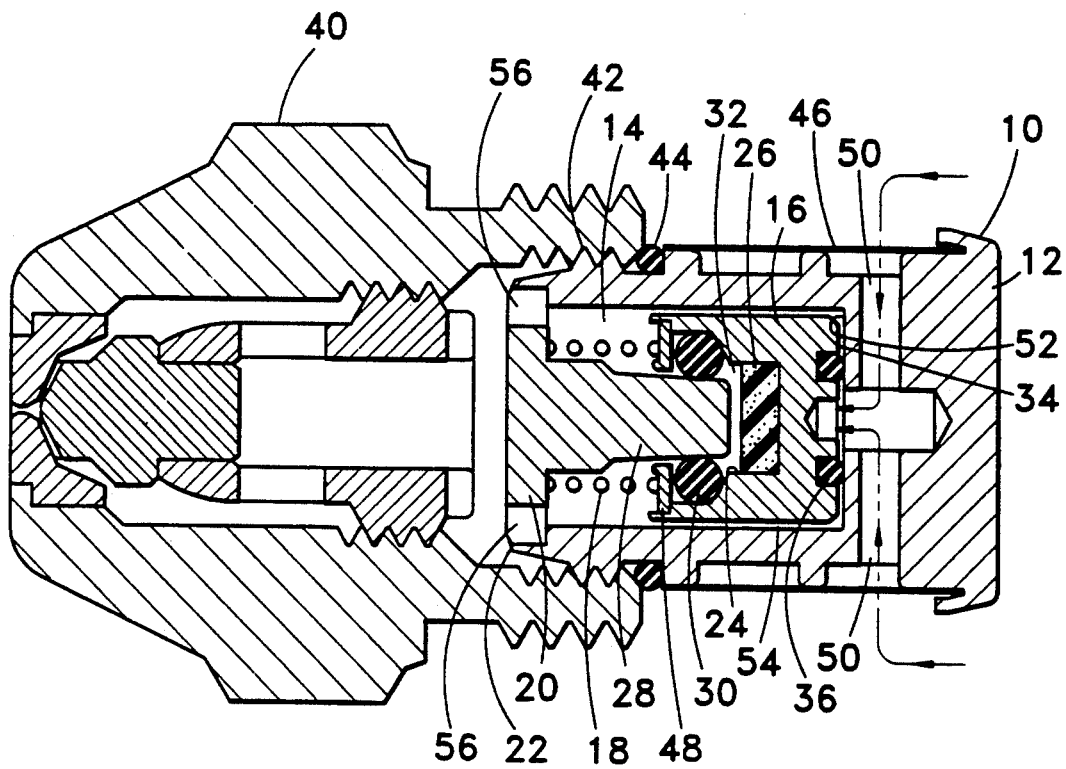
FIG. 1 is a substantially enlarged cross-sectional view of a check valve and oil burner nozzle combination according to the invention and with the valve in the closed position.
Figure 2:
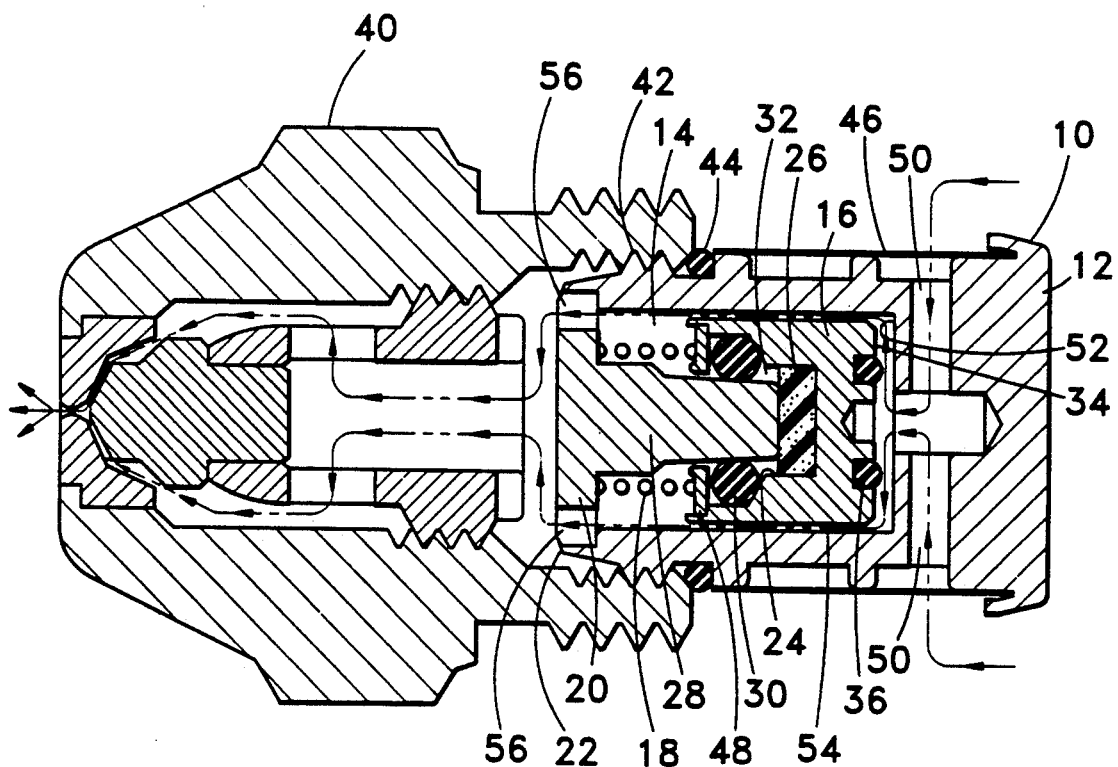
FIG. 2 is a view similar to FIG. 1 except that the valve is in the open position and the flow path is shown.

With reference now to the drawings, FIG. 1 shows a valve in combination with a spray nozzle such as for an oil burner where it is desired that in the event of valve failure, the valve will be in an open position. Valve assembly 10 comprises a valve body 12 formed with an elongated annular recess 14. Disposed within recess 14 is a piston 16 which in the absence of fluid pressure is held in the closed position by piston moving means such as spring 18. Spring 18 is held in position against piston 16 by valve cone 20 which is in turn held in place within recess 14 by crimped end 22 of body 12. Piston 16 is formed with an internal recess defined by wall 24. Disposed within that recess is an element 26 of closed-cell foam material. Wall 24 together with surface 28 of cone 20 and seal ring 30 combine to form a sealed gas chamber 32 which contains within it closed cell foam element 26. A recess in face 34 of piston 16 carries annular seal ring 36. The entire valve assembly 10 is retained in the base of nozzle 40 by threaded connection 42 which is sealed by seal ring 44. Preferably valve assembly 10 includes an intake screen 46 to filter out any contaminating particles which might otherwise plug the valve or the nozzle. Assembly 10 also preferably includes a spring guide 48 which helps to keep spring 18 in proper alignment and to minimize the dangers of damage to seal ring 30. In operation, when a pump (not shown) is turned on, fuel flows into inlet ports 50. When fluid pressure in inlet ports 50 reaches a predetermined level, piston 16 compresses spring 18 and lifts seal ring 36 away from surface 52 of valve body 12 thus allowing fuel to flow through passageway 54 into that portion of recess 14 which is behind or past piston 16 and then into nozzle 40 via outlet ports 56. The flow path through the valve and nozzle is shown by the dotted line and arrows in FIG. 2 which is like FIG. 1 except that the valve is in the open position. In prior arrangements, the fluid pressures on either side of piston 16 have tended to partially cancel one another, causing a substantial pressure drop and the necessity of using a higher pump pressure to maintain a sufficient compressive load on spring 18. In the current arrangement the presence of sealed chamber 32 provides means to balance a substantial portion of the fluid pressure in that portion of recess 14 behind piston 16, thus effectively reducing the pressure drop across the piston. As piston 16 moves away from surface 52, seal 30 moves along valve cone surface 28 keeping chamber 32 sealed, chamber 32 is thus reduced in volume and the pressure within that chamber increases and helps to hold spring 18 in compression and to balance pressure in recess 14. Valve cone surface 28 is preferably somewhat frusto-conical so that as piston 16 moves to open the valve, seal 30 is more highly compressed or squeezed and is thus more effective in sealing the higher pressure which develops in chamber 32. In the event that there is any failure of seal ring 30 and fuel gets into chamber 32, the presence of closed-cell foam element 26 insures that at least some gas pressure is maintained within chamber 32. In this way, assurance is given that the valve will open when the pump operates although there may be some pressure drop. If there is a failure of spring 18 or of seal 36, there will be a continual delivery of fuel through valve 10 as long as the pump is operating although again there will likely be some loss of efficiency.

While the novel valve in its preferred form includes a closed-cell foam element 32 to guard against complete loss of gas pressure should seal 30 fail, a suitable alternative embodiment may be made with an element having a single closed cell. Such an embodiment will function properly as long as the single cell remains intact and closed. In yet another alternative embodiment, the gas-filled closed-cell element may be omitted entirely. However, in such a form, if seal 30 fails and chamber 32 completely fills with fluid, the valve will not function.

Except for the cellular element 26 in chamber 32 and the various seal rings, all elements of the valve assembly will most likely be of metal alloys such as brass or steel, although other relatively rigid materials such as various plastics or ceramics may be employed for one or more parts. Seal rings 30, 36 and 44 will most likely be made of elastomeric material but other resilient materials such as some plastics may be used. A preferred material for foam element 26 is epichlorohydrin although other elastomers or plastics may be used.

Within the scope of the preceding description of preferred embodiments of the invention numerous variations are possible. For instance, although it is preferable for such a valve to operate in a "fail open" mode in applications such as with oil burner nozzles, a similar check valve incorporating a gas-filled closed cell foam element could be built to remain closed in the event of a failure of the sealed chamber in the back of the piston. Such an embodiment would be useful in agricultural spraying for example and would most likely involve turning the piston and valve cone elements around to face in the opposite direction. Furthermore, while the invention may have particular utility in the valve-nozzle combinations described in detail, the novel features reside in the valve which may be used as a check valve in other fluid handling applications which do not involve nozzles. Thus, the preceding specification should be interpreted as exemplary rather than as limiting and the scope of the invention is defined by the following claims.

We claim:
1. A check valve comprising;
   (a) a valve body having a piston receiving recess and at least one inlet port extending through an otherwise closed end of said body,
   (b) a piston located in said piston receiving recess, said piston having a face at one end and a recess in its opposite end,
   (c) a valve cone retained in said valve body recess axially outwardly of said piston recess,
   (d) a first seal member positioned between said face of said piston and said end of said valve body to form a seal around said at least one inlet port when said valve is in a closed configuration,
   (e) a second seal member positioned between a wall of said piston recess and a surface of said valve cone thus creating a sealed gas chamber,
   (f) piston moving means positioned between said piston and said valve cone, said means adapted to move said piston to its closed position when fluid ceases to enter said at least one inlet port, and
   (g) said valve body having a flow path when said valve is in an open configuration to permit fluid flow to enter said valve through said at least one inlet port, to pass between said piston receiving bore and said piston and then to exit the valve through at least one outlet port.

2. The check valve of claim 1 in which said sealed gas chamber has within it an element having at least one gas-filled closed cell.

3. The check valve of claim 2 in which said element comprises a body having a plurality of gas-filled closed cells.

4. The check valve of claim 3 which said body comprises foam.

5. The check valve of claim 1 in which said piston moving means comprises a spring.

6. The check valve of claim 1 in which said at least one outlet port passes through said valve cone.

7. The check valve of claim 1 in which said at least one outlet port passes through said valve body.

8. In a nozzle and valve assembly the improvement which comprises the use of a check valve comprising;
   (a) a valve body having a piston receiving recess and at least one inlet port extending through an otherwise closed end of said body,
   (b) a piston located in said piston receiving recess, said piston having a face at one end and a recess in its opposite end,
   (c) a valve cone retained in said valve body recess axially outwardly of said piston recess,
   (d) a first seal member positioned between said face of said piston and said end of said valve body to form a seal around said at least one inlet port when said valve is in a closed configuration,
   (e) a second seal member positioned between a wall of said piston recess and a surface of said valve cone thus creating a sealed gas chamber,
   (f) piston moving means positioned between said piston and said valve cone, said means adapted to move said piston to its closed position when fluid ceases to enter said at least one inlet port, and
   (g) said valve body having a flow path when said valve is in an open configuration to permit fluid flow to enter said valve through said at least one inlet port, to pass between said piston receiving bore and said piston and then to exit the valve through at least one outlet port.

9. The assembly of claim 8 in which said check valve has within said sealed gas chamber an element comprising a body having at least one gas-filled closed cell.

10. The assembly of claim 9 in which said element comprises a body having a plurality of gas-filled closed cells.

11. The assembly of claim 10 in which said body comprises foam.

12. The assembly of claim 8 in which said piston moving means comprises a spring.

13. The assembly of claim 8 in which said at least one outlet port passes through said valve cone.

14. The assembly of claim 8 in which said at least one outlet port passes through said valve body.

* * * * *